United States Patent
Zhang et al.

(10) Patent No.: US 11,706,613 B2
(45) Date of Patent: Jul. 18, 2023

(54) INFORMATION PROCESSING METHOD

(71) Applicant: Lenovo (Beijing) Co., Ltd., Beijing (CN)

(72) Inventors: Liang Zhang, Beijing (CN); Shutao Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 530 days.

(21) Appl. No.: 16/832,177

(22) Filed: Mar. 27, 2020

(65) Prior Publication Data

US 2020/0314643 A1    Oct. 1, 2020

(30) Foreign Application Priority Data

Mar. 28, 2019    (CN) .......................... 201910243872.3

(51) Int. Cl.
*H04W 12/02*    (2009.01)
*H04L 67/141*   (2022.01)
*H04W 12/06*    (2021.01)

(52) U.S. Cl.
CPC ........... *H04W 12/02* (2013.01); *H04L 67/141* (2013.01); *H04W 12/06* (2013.01)

(58) Field of Classification Search
CPC ...... H04W 12/02; H04W 12/06; H04L 67/141
See application file for complete search history.

(56) References Cited

U.S. PATENT DOCUMENTS

| 11,126,747 B2 * | 9/2021 | Song ..................... H04M 1/724 |
| 2011/0014932 A1 * | 1/2011 | Estevez .................. G01S 19/14 |
| | | 455/466 |
| 2016/0021069 A1 | 1/2016 | Lindteigen et al. |
| 2017/0055151 A1 * | 2/2017 | Kim .................. H04M 1/72469 |
| 2017/0171393 A1 * | 6/2017 | Cheng ................ H04N 21/4788 |
| 2017/0171727 A1 * | 6/2017 | DeLoy .................. G06F 3/0346 |
| 2021/0209206 A1 * | 7/2021 | Li ........................ G06F 1/1637 |

FOREIGN PATENT DOCUMENTS

| CN | 101345789 A | 1/2009 |
| CN | 104333662 A | 2/2015 |
| CN | 105554223 A | 5/2016 |
| CN | 105656938 A | 6/2016 |
| CN | 107659720 A | 2/2018 |
| CN | 108495310 A | 9/2018 |

* cited by examiner

*Primary Examiner* — Chau Le
(74) *Attorney, Agent, or Firm* — Anova Law Group, PLLC

(57) ABSTRACT

An information processing method is provided. The method includes: receiving a connection request of establishing a call connection, the connection request including a communication identifier of a requester; upon determining the communication identifier of the requester meeting a privacy condition, verifying an identity of a responder; and determining whether to permit a response of the responder to the connection request based on a verification result of the identity of the responder.

16 Claims, 9 Drawing Sheets

INFORMATION PROCESSING METHOD

CROSS-REFERENCE TO RELATED APPLICATION

This application claims priority to Chinese Patent Application No. 201910243872.3, entitled "Information Processing Method," filed on Mar. 28, 2019, the entire content of which is incorporated herein by reference.

FIELD OF TECHNOLOGY

The present disclosure relates to the field of information technology and, more particularly, to an information processing method.

BACKGROUND

In conventional technology, when an electronic device is in a calling state, such as receiving a voice call request, a video call request, etc., anyone can directly accept the call request. When the owner or the user of the electronic device is not near the electronic device, other people can also answer any call request, which may leak the private information of the owner or the user of the electronic device.

BRIEF SUMMARY OF THE DISCLOSURE

One aspect of the present disclosure provides an information processing method. The method includes: receiving a connection request of establishing a call connection, the connection request including a communication identifier of a requester; upon determining the communication identifier of the requester meeting a privacy condition, verifying an identity of a responder; and determining whether to permit a response of the responder to the connection request based on a verification result of the identity of the responder.

Another aspect of the present disclosure provides an information processing method. The method includes acquiring a contact list; and identifying and setting a privacy label for one or more contacts from the contact list. The privacy label indicates a determination is required, when receiving a connection request from a contact with the privacy label, about whether a responder is permitted to response to the connection request.

Another aspect of the present disclosure provides an electronic device including a processor and a memory. The processor is configured to perform: receiving a connection request of establishing a call connection, the connection request including a communication identifier of a requester; upon determining the communication identifier of the requester meeting a privacy condition, verifying an identity of a responder; and determining whether to permit a response of the responder to the connection request based on a verification result of the identity of the responder.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Figure 1:
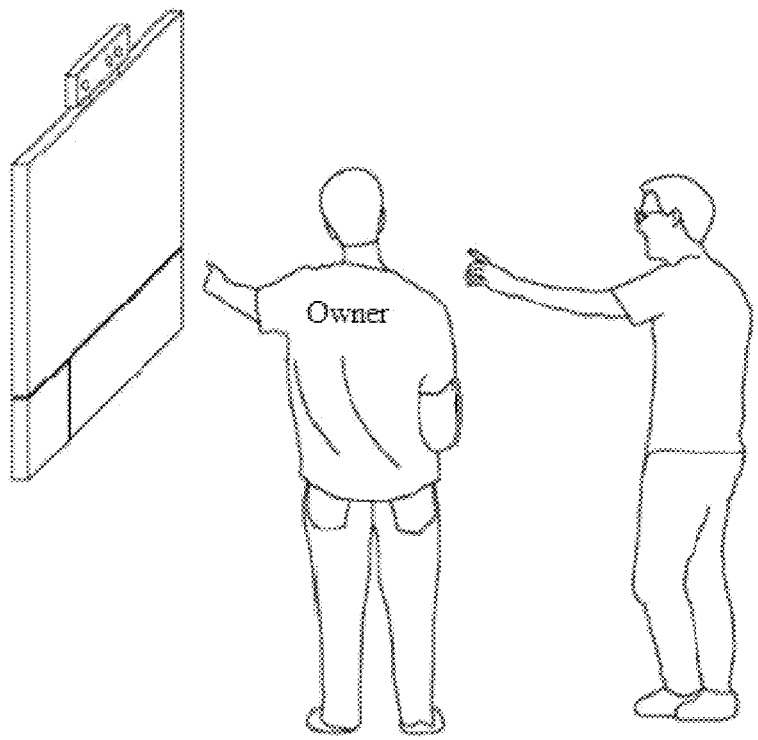
FIG. 1 is an application scenario of an information processing method according to an embodiment of the present disclosure.
Figure 1:
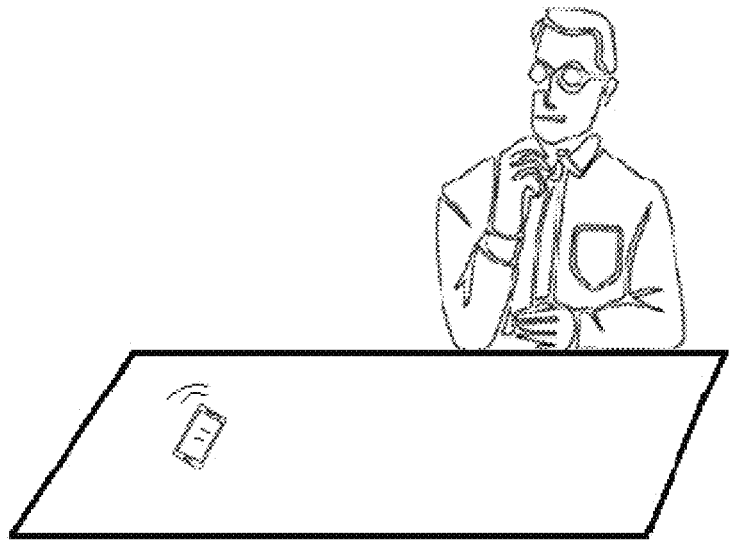

The technical solutions provided by the present disclosure according to various embodiments are described below with reference to the drawings. The described embodiments are only part of the embodiments of the present disclosure. Other embodiments acquired by a person of ordinary skill in the art based on the described embodiments without departing from the spirit of the disclosure are the within scope of the present disclosure. It should be understood that such description is illustrative only but is not intended to limit the scope of the present disclosure. In addition, in the following description, known structures and technologies are not described to avoid unnecessary obscuring of the present disclosure.

The terms used herein is for the purpose of describing particular embodiments only, but is not intended to limit the present disclosure. The terms such as "comprising", "including", "containing" and the like as used herein indicate the presence of the features, steps, operations and/or components, but do not preclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present disclosure and should not be interpreted in an idealized or overly stereotyped manner.

In terms of a statement such as "at least one of A, B, and C, etc.," it should be generally interpreted in light of the ordinary understanding of the expression by those skilled in the art. For example, "a system including at least one of A, B, and C" shall include, but is not limited to, a system including A alone, a system including B alone, a system including C alone, a system including A and B, a system including A and C, a system including B and C, and/or a system including A, B, and C, etc. In terms of a statement similar to "at least one of A, B or C, etc.", it should generally be interpreted in light of the ordinary understanding of the expression by those skilled in the art. For example, "a system including at least one of A, B or C" shall include, but is not limited to, a system including A alone, a system including B alone, a system including C alone, a system including A and B, a system including A and C, a system including B and C, and/or a system including A, B, and C, etc.

A few block diagrams and/or flowcharts are shown in the accompanying drawings. It should be understood that some of the blocks or combinations thereof in the block diagrams and/or flowcharts may be implemented by computer executable instructions. The computer executable instructions may be provided to a general purpose computer, a dedicated computer, or processors of other programmable data processing apparatus, so that the instructions, when being executed by the processor, may create means for implementing the functions/operations as described in the block diagrams and/or flowcharts.

Thus, the techniques of the present disclosure may be implemented in forms of hardware and/or software (including firmware, microcode, etc.). In addition, the techniques of the present disclosure may be embodied in a form of computer program instructions stored in a computer readable medium. The computer program instructions may be used by an instruction execution system or in conjunction with an instruction execution system. In the context of the present disclosure, the computer readable medium may be any medium capable of containing, storing, transmitting, propagating, or transmitting instructions. For example, the computer readable media may include, but are not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

Embodiments of the present disclosure provide a communication method for each of a plurality of robots and a robot that can implement the method. The method includes an identification process and an information transmitting and receiving process. During the identification process, each robot can send identification signals identifying itself at different time slots and, receive identification signals from other robots. Based on the received identification signals, the plurality of robots can identify each other. After the identification is complete, the information transmitting and receiving process may start, and the plurality of robots may communicate with each other based on the predetermined rules.

FIG. 1 is an application scenario of an information processing method according to an embodiment of the present disclosure. It should be noted that FIG. 1 is merely an example of an application scenario to which the embodiments of the present disclosure can be applied to help those skilled in the art understand the technical content of the present disclosure. However, the embodiments of the present disclosure can be applied to other devices, systems, environments, or scenarios.

As shown in FIG. 1, an owner is in a conversation with a colleague, a customer, a family member, a friend, etc., and does not have a mobile phone with him. In conventional technology, due to the high priority of an electronic device's calling function, when someone else sees a phone call on the mobile phone, such as a family member, a colleague, a friend, or even a stranger may help the owner to answer the call. As such, there is a risk that the owner or the user's privacy may be leaked. In particular, for some special calls, the owner may wish to be the only person answering the calls in order to protect his privacy.

The information processing method provided in the present disclosure includes a privacy condition determination process and an identity authentication process. In particular, in the process of determining the privacy condition, after acquiring a connection request (the connection request may include at least a communication identifier of the requester) for establishing a call connection, whether the communication identifier of the requester meets the privacy condition may be determined first. If the communication identifier of the requestor meets the privacy condition, the identification authentication process may be entered, and an identity authentication unit may be called. Subsequently, the identity of the responder may be verified based on the identity authentication unit, and when the authentication is passed, the responder may be determined to be able to respond to the connection request for the call connection.

Figure 2:
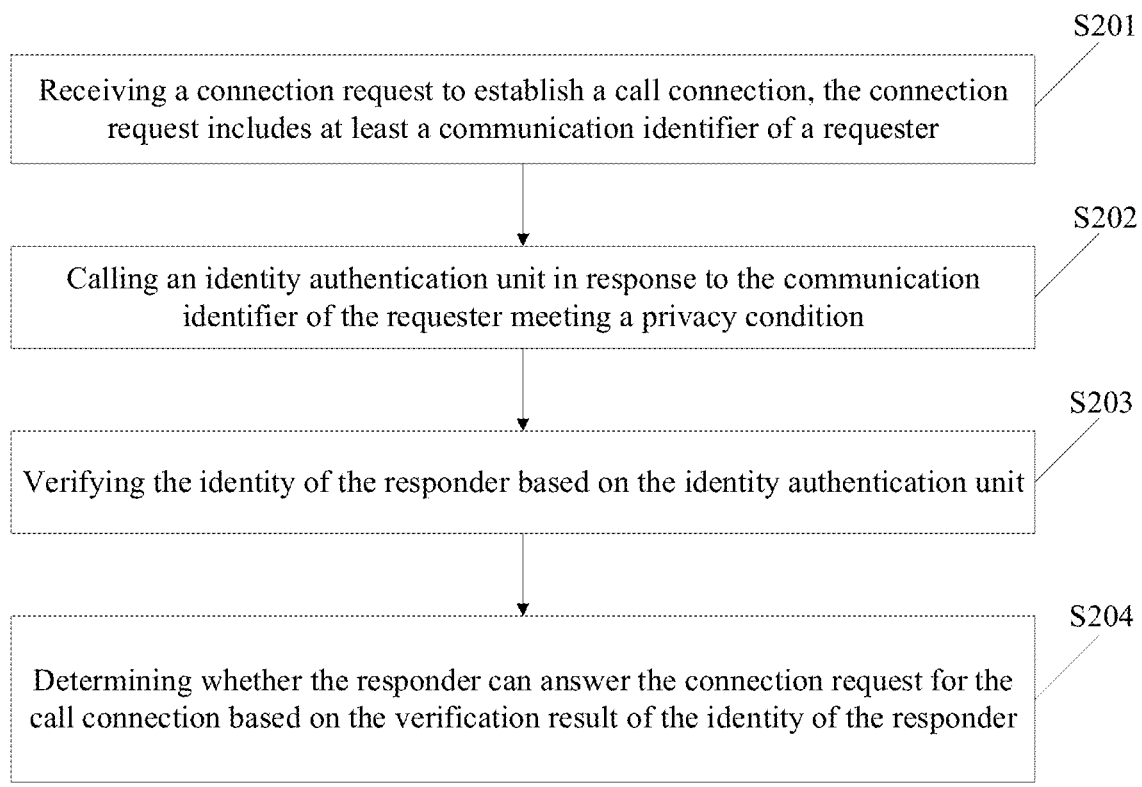
FIG. 2 is a flowchart of an information processing method according to an embodiment of the present disclosure.

FIG. 2 is a flowchart of the information processing method according to an embodiment of the present disclosure. The information processing method is described in detail below.

S201, receiving a connection request of establishing a call connection, the connection request includes at least a communication identifier of a requester.

In some embodiments, when the requester makes a call to the user, initiates a voice call request, or initiates a video call request, the connection is generally established with the responder based on the communication identifier of the responder, such as establishing a connection with the responder based on the user of a communication application, such as a mobile phone number, a WeChat user name, or a QQ user name, or a user name of a mailbox. That is, in conventional technology, a person having the access credential to use these communication identifiers is assumed as a responder. However, in practice, there may be situation where the responder does not carry the mobile phone, or the responder does not carry the electronic device after logging into an application (e.g., authorizing the electronic device to log in an account of a server of the application) corresponding to these communication identifiers on the electronic device (e.g., a tablet computer, s smart device, a laptop, a wearable electronic device, an in-vehicle electronic device, etc.). In some cases, the two parties of the call (including the responder and the requester) may wish that only the owner (or an authorized person) of the electronic device can answer the connection request.

S202, calling an identity authentication unit in response to the communication identifier of the requester meeting a privacy condition.

In some embodiments, the privacy condition may be a communication identifier that has been set with a privacy label by the responder, for example, the responder has made a privacy-related note on the communication identifier after receiving a call request from the communication identifier, the responder has set a privacy attribute on the communication identifier on the electronic device, the responder has set the name of the user corresponding to the communication identifier in some applications as a private contact, the responder has set the privacy attribute, etc. of the related accounts of the user corresponding to the communication identifier, or whether the communication identifier can be matched in a predetermined privacy-related database.

In some embodiments, the requester's communication identifier meeting the privacy condition may include the communication identifier of the requester meeting the privacy condition in response to the communication identifier of the request belonging to a privacy form. In other words, the privacy form may be searched to see if it includes the communication identifier of the requester. It can be determined that the communication identifier of the requester meets the privacy condition upon determining the communication identifier of the request belonging to the privacy form. The privacy form may be stored in a database and may include one or more communication identifiers set by the owner or the authorized person of the mobile device or the electronic device. The database may include one or more of the following information: names, mobile phone numbers, names of the instant messaging application, account numbers of the instant messaging application, account numbers of the application including a calling function (e.g., an application including an interaction function between users), identification card numbers, etc.

For example, generating the privacy form may include the following operations.

First, identify and set a privacy label for one or more contacts from the contact list. In some embodiments, the contact list may include, but is not limited, a phone contact list, a WeChat contact list, a QQ friend list, a mailbox contact list, an Alipay contact list, various instant messaging application contact lists, various association contact lists, a shopping application contact list with the calling function, etc.

In some embodiments, the privacy label may be set by using various methods for setting the privacy label in conventional technology, such as using an attribute setting, adding an identifier, etc. Further, a communication identifier may be automatically noted for satisfying a predetermined condition by using predetermined conditions.

Subsequently, the privacy form may be generated based on the contacts including the privacy labels.

For example, the contacts with the privacy label may be stored in a database and provided to the user in the form of a form when the user needs to use the contacts. Of course, the privacy form can be protected by setting a password and other methods to avoid data leakage of the privacy form.

More specifically, the electronic device may include an acquisition component. Correspondingly, if the communication identifier of the requester meets the privacy condition, the calling of the identity authentication unit may include the operations of calling the acquisition component to acquire user biometric information, and performing identity authentication based on at least the user's biometric information. In some embodiments, the biometric information may include one or more of fingerprint information, image information, voiceprint information, or infrared image information. Further, the comparison information for identity authentication may be entered by the user in the electronic device in advance.

In addition, in the process of calling the acquisition component to acquire the user biometric information, the user may also be prompted to perform information collection.

It should be noted that if the communication identifier of the requester does not belong to the privacy form, then the communication identifier of the requester does not meet the privacy condition, which may indicate that the requester does not involve and is less involved in the privacy of the responder. As such, no identity authentication is required, and anyone may answer the connection request.

S203, verifying the identity of the responder based on the identity authentication unit. In other words, upon determining that the communication identifier of the requester meets a privacy condition, an identity of a responder may be verified.

In some embodiments, the identity authentication unit may include, but is not limited to, one or more of a fingerprint authentication component, a facial recognition component, an iris identification component, a password (including numbers and figures) authentication component, a voiceprint recognition component, and other authentication units available in conventional technology.

It should be noted that the identity authentication unit may directly call an existing identity authentication unit on the electronic device, such as a fingerprint authentication component, a facial recognition component, and a password authentication component for unlocking a mobile phone. In addition, the identity authentication unit may be a separately set authentication unit. For example, if the fingerprint for unlocking the mobile phone is not entered in the separately set authentication unit, the identity authentication may fail to pass.

S204, determining whether the responder can answer the connection request for the call connection based on the verification result of the identity of the responder. In other words, whether to permit a response of the responder to the connection request can be determined based on a verification result of the identity of the responder. In some embodiments, the response of the responder may be accepting the connection request, denying the connection request, and/or sending a reply message to the requester.

In the present embodiment, the determination of whether the responder can answer the connection request based on the verification result of the identity of the responder may include the following operations.

In some embodiments, if the verification result indicates that the verification of the responder is passed, the connection request for the call connection may be responded to. For example, a virtual answering button may change from an unavailable state (such as in a gray display) to an available state (such as a red display), or the connection may be responded when a specific person acts as the responder.

In some embodiments, if the verification result indicates that the verification of the responder fails, the connection request for the call connection may be prohibited from responding.

In addition, one or more privacy levels may be set in the privacy form. For example, the call request of the communication identifier in the first may have the highest level of privacy. Regardless of how many call requests are initiated by the requester in the first level, as long as the identity verification of the responder fails, the call request of the communication identifier in the first level may not be answered. The call request in the second level may have a slightly lower privacy. For example, if the call request of the communication identifier in the second level exceeds a predetermined number of call requests continuously, the call request may be answered even if the identity authentication of the responder fails. As such, the situation of where the user with the communication identifier in the second level cannot establish a connection with the electronic device at all when an important event occurs may be avoided. The above is merely an example, and there may be more levels, which are not limited in the present disclosure.

In some embodiments, the information processing method may include an operation S205.

S2005, allowing the connection request for the call connected to be responded to in response to the user identifier of the requester not meeting the privacy condition. In other words, if the verification result of the identity verification of the responder passes, the response of the responder to the connection request is permitted.

In some embodiments, if the user identifier of the requester does not meet the privacy condition, it may indicate that the requester is not involved in the privacy of the responder. As such, any other person may answer the connection request from the requester that does not meet the privacy condition, which may reduce the frequency of calling the identity authentication unit, and the consumption of computing resources, etc.

In some embodiments, the method may further include the following operation.

Displaying an interactive interface in response to receiving a connection request of establishing a call connection. The interactive interface may include at least a communication identifier of the requester and an answering control. The answering control may include a first state and a second state. The first state may indicate that the connection request for the call connection is permitted to be responded to, and the second state may indicate that the connection request for the call connection may be prohibited from responding. In some embodiments, the first or second state of the answering control is determined based on the verification result of the identity of the responder. In some embodiments, the answering control may be at the second state when receiving the connection request, and switched to the first state when verification of the responder succeeds.

In some embodiments, if the answering control is in the first state, an input operation for the answering control in the first state may be acquired, and a communication connection with the communication identifier of the requester may be established in response to the input operation.

In some embodiments, if the answering control is in the second state, an input operation for the answering control in the second state may be acquired, and the input operation may be ignored.

The following uses FIG. 3A to FIG. 3E as example for further description.

Figure 3A:
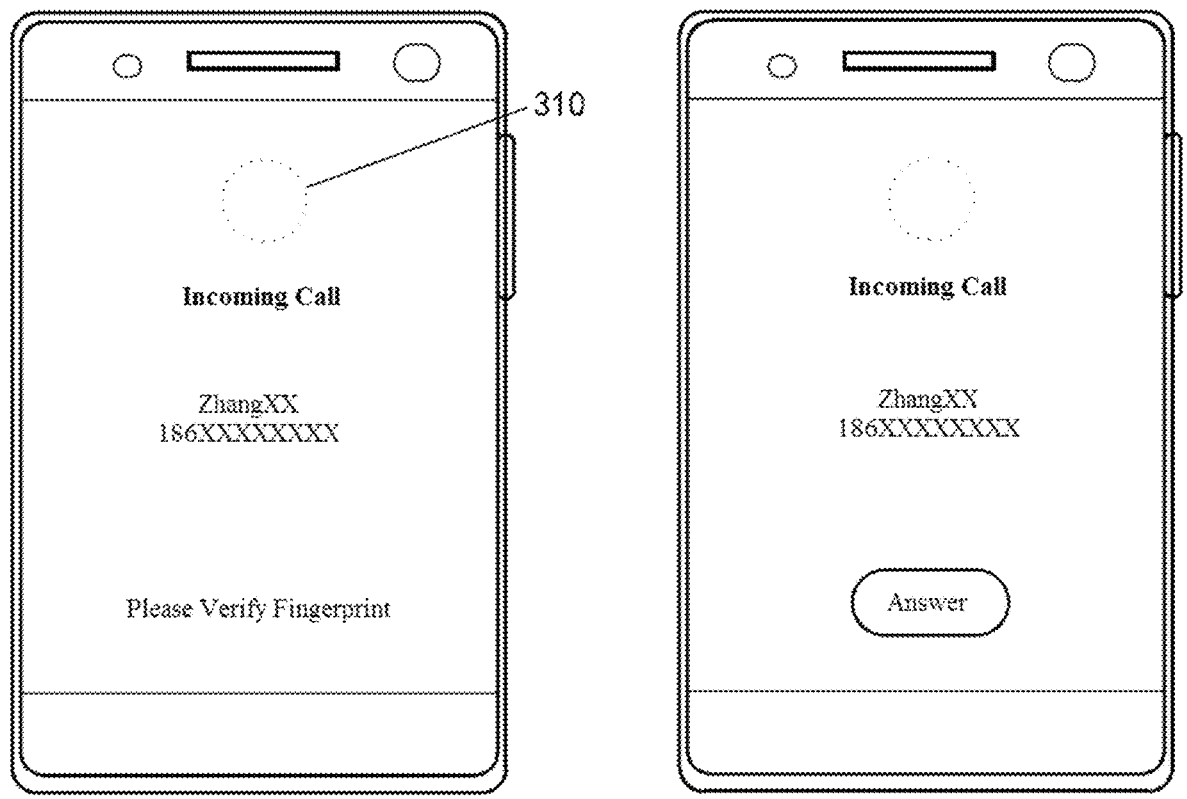
FIG. 3A is a diagram of verifying the identity of a responder according to an embodiment of the present disclosure.

FIG. 3A is a diagram of verifying the identity of a responder according to an embodiment of the present disclosure.

As shown in FIG. 3A, the identity authentication unit is being described by using a fingerprint authentication unit 310 as an example. The fingerprint authentication unit 310 may include a component (e.g., a fingerprint sensor) disposed on an electronic device, such as on the back, the side, under a screen, or embedded in a touch screen of a mobile phone. In the present embodiment, the identity authentication unit is the fingerprint authentication unit 310 disposed on the back of the mobile phone. When the connection request is received from a requester Zhang XX for a call connection, the display screen of the electronic device used by the responder displays the interactive interface as shown in the left figure of FIG. 3A. In particular, the communication identifier includes the name (Zhang XX) and phone number (186XXXXXXXX) of the requester of the incoming call. As shown in the left figure of FIG. 3A, since the number of 186XXXXXXXX exists in the privacy form, the communication identifier of the requester meets the privacy condition. At this time, a prompt message can be displayed on the interface, such as verifying the fingerprint. The electronic device (e.g., finger authentication unit) may collect fingerprint information of a responder and perform fingerprint verification (e.g., based on a fingerprint template prestored on the electronic device by an owner). When the fingerprint verification fails, the answering condition may be in the second state, such that the answering control may be invisible. In addition, the second state may also be a disabled state. As such, even if the responder clicks the area of the answering control or the answering control in the disabled state, the connection request for the call connection may not be responded. As shown in the right figure of FIG. 3A, when the fingerprint verification is passed, the answering control may be in the first state, such as adjusting the answering control in the invisible state to the answering control in the visible state. Of course, the first state may also include adjusting the answering control in the disabled state to the answering control in the available state.

It should be noted that the answering method can also be set to directly answer the connection request for the call connection when the fingerprint verification is passed based on user requirements.

Figure 3B:
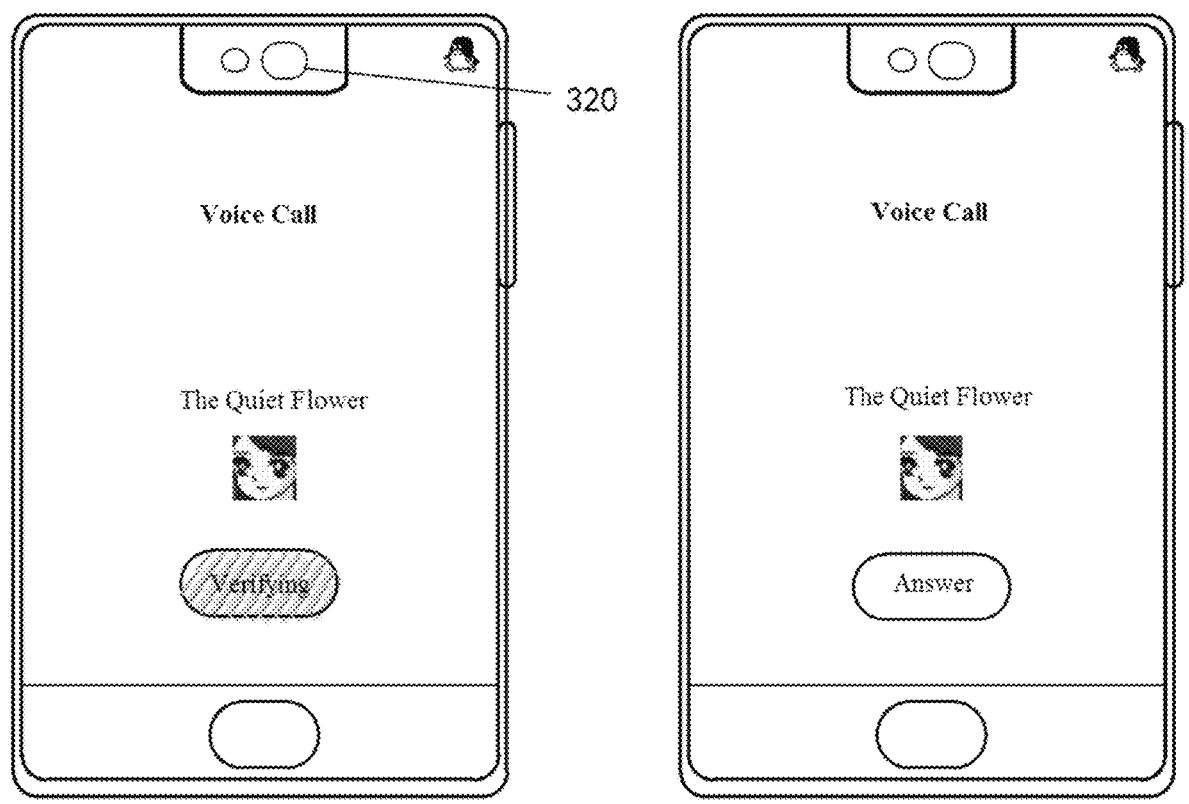
FIG. 3B is a diagram of verifying the identity of a responder according to another embodiment of the present disclosure.

FIG. 3B is a diagram of verifying the identity of a responder according to another embodiment of the present disclosure.

As shown in FIG. 3B, the identity authentication unit is being described by using a facial authentication unit 320 as an example. The facial authentication unit 320 may include a component (e.g., a camera) disposed on an electronic device, such as the top, bottom, or under the screen of a mobile phone, or on the surface of the back panel of a liftable platform or a slide-type mobile phone. In the present embodiment, the identity authentication unit is the facial authentication unit 320 disposed in the fringe area of the mobile phone. When the connection request for a voice call is received from a requester "The Quiet Flower" (such as a user nickname of QQ, Skype, etc.), the display screen of the electronic device used by the responder displays the interactive interface as shown in the left figure of FIG. 3B. In particular, the communication identifier includes the client's nickname "The Quiet Flower" (which can correspond to a user ID) and its avatar. As shown in the left figure of FIG. 3B, since the name of "The Quiet Flower" exists in the privacy form, the communication identifier of the requester meets the privacy condition. At this time, the answering control in the second state (such as the disabled state) can be displayed on the interface, such as displaying an icon different from the answering control in the first state. In addition, a message may also be displayed on the interface. For example, a message of "verifying" can be displayed in the answering control area in the second state. At this time, the camera may be acquiring a face image of the responder and performing face recognition (e.g., based on a template face image prestored on the electronic device by the owner). When the face recognition fails, the answering control may remain in the second state, such as the disabled state. As such, even if the responder clicks the answering control in the disabled state, the connection request for the voice call may not be responded. As shown in the right figure of FIG. 3B, when the face recognition is passed, the answering control may be in the first state, such as adjusting the answering control in the disabled state to the answering control in a usable state.

It should be noted that different connection request conditions may be set based on the privacy level of the requester. When a connection request condition is met, for example, for a requester with a lower privacy level sending a voice call request that lasts 15 seconds, and the responder fails the verification process and a verification failure is prompted on the interface. Further, the responder repeats the verification 5 more times and exceeds the predetermined connection request threshold, then the answering control may be adjusted to the first state. In this case, emergency situations may be covered, such as when the user's face is injured or swelling which makes facial recognition difficult, or when the requester urgently needs someone to answer the call.

Figure 3C:
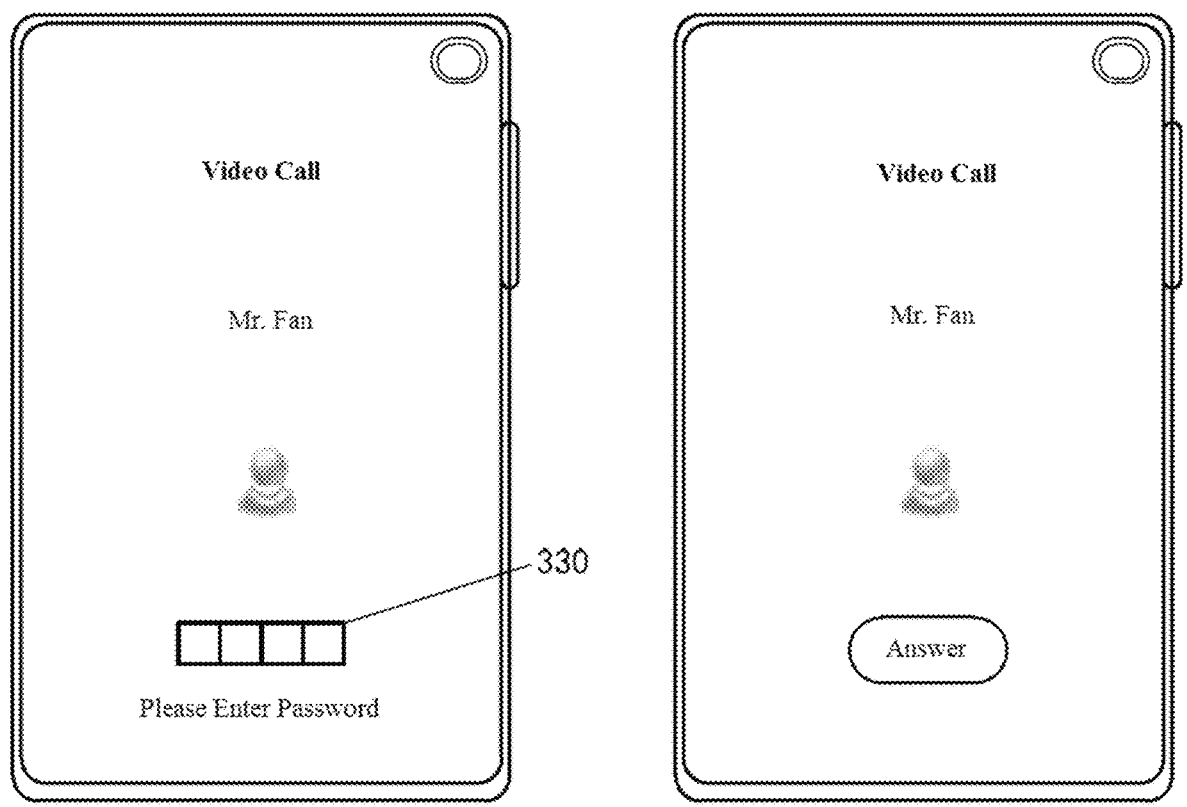
FIG. 3C is a diagram of verifying the identity of a responder according to another embodiment of the present disclosure.

FIG. 3C is a diagram of verifying the identity of a responder according to another embodiment of the present disclosure.

As shown in FIG. 3C, the identity authentication unit may also be a password verification unit 330.

The password verification process may adopt a password authentication process in conventional technology. The password may be a password agreed in advance by the requester and the responder. Before the password authentication is passed, the answering control may not establish a connection in response to the user's operation. Only after the password authentication is passed, the connection for the video call may be established.

Figure 3D:
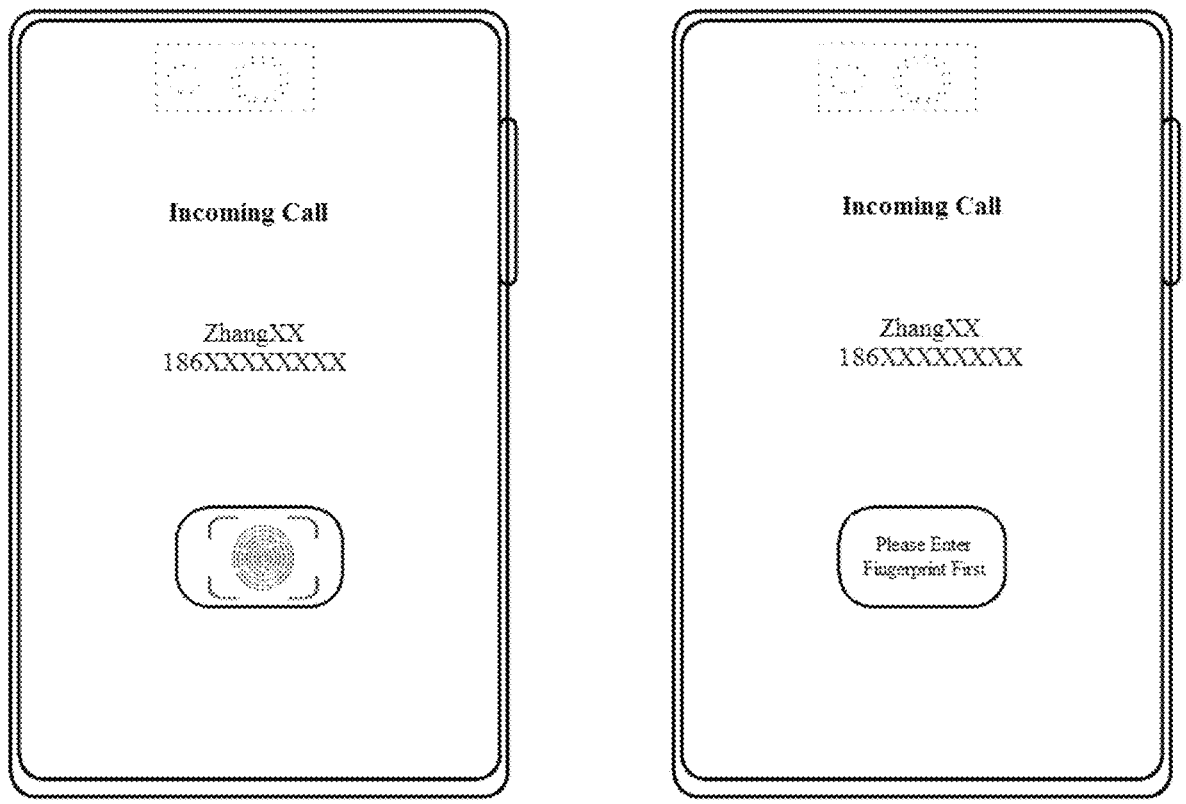
FIG. 3D is a diagram of verifying the identity of a responder according to another embodiment of the present disclosure.

FIG. 3D is a diagram of verifying the identity of a responder according to another embodiment of the present disclosure.

As shown in FIG. 3D, the electronic device includes a full-screen and a fingerprint acquisition component. The fingerprint acquisition component may be stacked with the full-screen, and the acquisition area of the fingerprint acquisition component may be smaller than or equal to the display area of the display screen, that is, the fingerprint acquisition component may be an acquisition component under the full-screen.

More specifically, as shown in the left figure of FIG. 3D, after receiving a connection request of establishing a call connection, the acquisition area of the fingerprint collection component can be set on the display area of the answering control on the display screen. In addition, a fingerprint acquisition prompt message may also be displayed in the display area of the answering control, and the answering control may be configured to accept the call request in response to the user input. If the responder's fingerprint authentication is successful, which is equivalent to clicking the answering control at the same time, which may improve the user convenience. As shown in the right figure of FIG. 3D, when the fingerprint authentication fails, the following message may be displayed on the display area corresponding to the answering control: "Fingerprint authentication failed, please enter the fingerprint first".

In some embodiments, the connection request may further include an authentication template sent by the requester, which may be used to determine whether the requester's communication identifier meets the privacy condition. The authentication template may include, but is not limited to, password, face image of the responder, gender, a photo of an agreed object (such as tokens share by both parties, items given by one party, etc.). It should be noted that when the authentication template is a face image of the responder, a photo of an agreed object, etc., the authentication template may be displayed on the interface of the incoming call to prompt the responder, or the authentication template may not be displayed to avoid privacy leakage.

Correspondingly, verifying the identity of the responder based on the identity authentication unit may include verifying the identity of the responder based on the information acquired by the identity authentication unit and the authentication template.

Figure 3E:
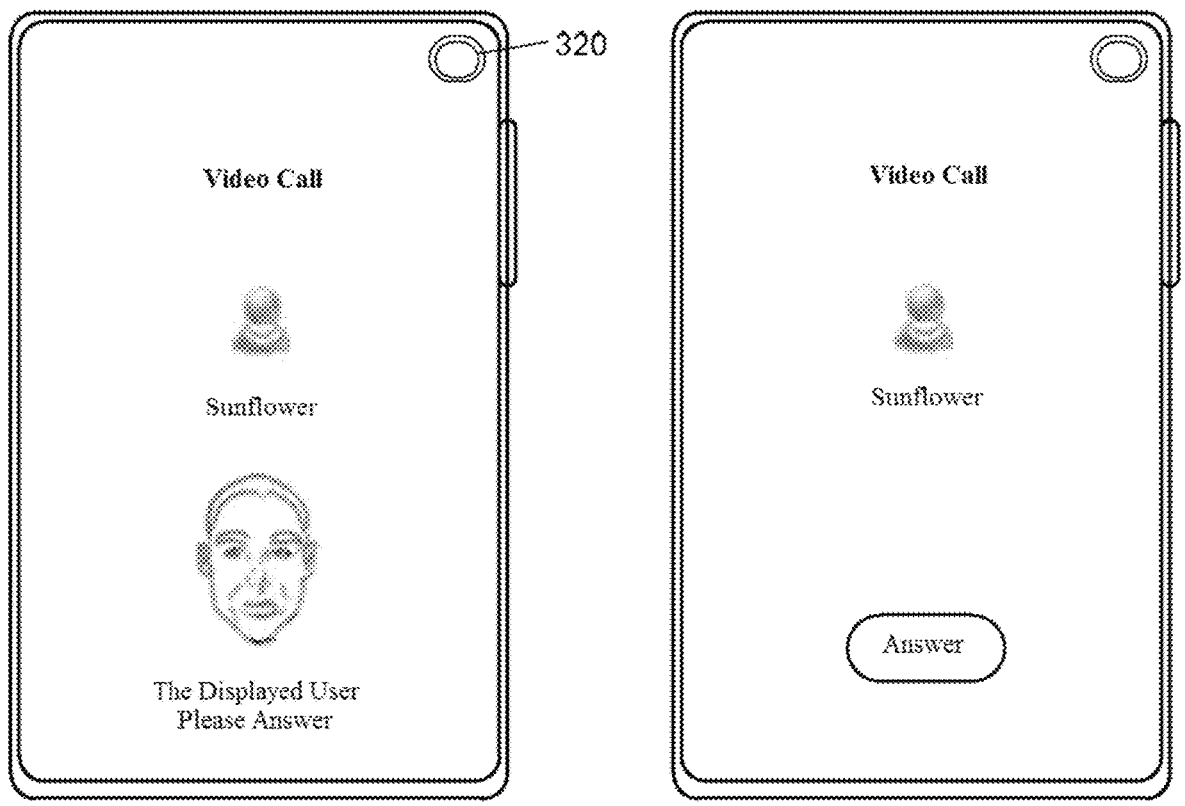
FIG. 3E is a diagram of verifying the identity of a responder according to another embodiment of the present disclosure.

FIG. 3E is a diagram of verifying the identity of a responder according to another embodiment of the present disclosure.

As shown in FIG. 3E, the authentication template is being described by using the responder's face image as an example. The identity authentication unit may be the facial authentication unit 320. When the connection request is received from a requester "Sunflower" (such as a WeChat user nickname) for a video call, the display screen of the electronic device used by the responder displays the interactive interface as shown in the left figure of FIG. 3E. In particular, the communication identifier may include the client's nickname "Sunflower" and its avatar. In addition, the authentication template of the face image may be displayed on the interface. The face image may be a face image of the responder that the requester wished to receive the video call. As shown in the left figure of FIG. 3E, since the connection request includes the authentication template sent by the requester, the privacy condition is met. At this time, the answering control in the second state (such as the invisible state) can be displayed on the interface. In addition, a prompt message, such as the information displayed in the answering control area in the second state, may also be displayed in the interface to prompt the displayed user to answer the call. At this time, the camera may be acquiring the face image and comparing the acquired image with the authentication template. When the comparison fails, the answering control may remain in the second state. As shown in the right figure of FIG. 3E, when the comparison is passed, the answering control may be in the first state, such as adjusting the unavailable answering control to the available answering control. Of course, when the comparison is successful, the connection request may also be directly answered.

It should be noted that, as described above, the privacy form may include privacy levels, and the authentication method based on the authentication template can also set a plurality of privacy levels. For example, the authentication template for the face image type may have the highest privacy level, the authentication template for the specific item may have the second highest privacy level, and the authentication template for gender type may have the third highest privacy level. When the authentication template is a photo of a specific item, the fingerprint information of 3 people may be stored in the electronic device of the responder. When the requester continuously sends a connection request (include photo of the specific item) more than a predetermined number of times, such as 5 times, the existing fingerprint information in the electronic device may be successfully matched, and the connection request may be answered.

In some embodiments, after receiving the connection request for establishing a call connection, the method may further include the following operations.

On one hand, when the current electronic device is in a locked state, the identity authentication unit may be called to verify the identity of the responder (e.g., upon determining the communication identifier of the requester meeting the privacy condition). On the other hand, when the current electronic device is in an unlocked state, the communication identifier of any requester may be responded.

When the current electronic device is in the unlocked state, it may indicate that the user of the current electronic device has the right to use the electronic device or the owner of the electronic device can take over the electronic device at any time. As such, when the electronic device is in the unlocked state, it may indicate that the possibility of privacy leakage is relatively low, and it may not be necessary to perform identity authentication again. When the electronic device is in the locked state, there may be a possibility that the owner or authorized user of the electronic device may not be near the electronic device. As such, in order to reduce the risk of privacy leakage, the identity authentication unit may be called to verify the identity of the responder. Therefore, the frequency of use of the identity authentication unit may be effectively reduced, the life of the electronic device may be extended, and the energy consumption may be reduced.

Figure 4:
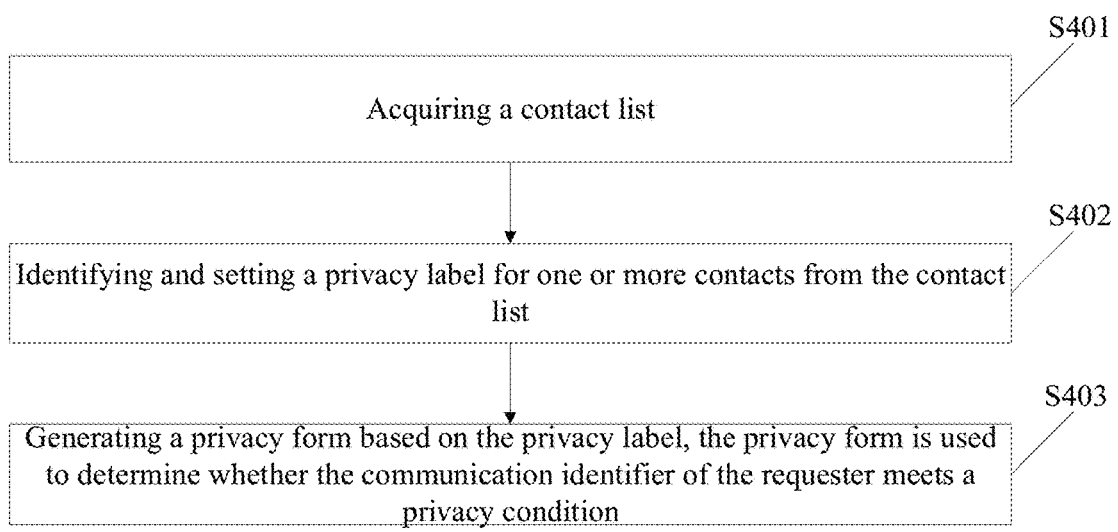
FIG. 4 is a flowchart of the information processing method according to another embodiment of the present disclosure.

FIG. 4 is a flowchart of the information processing method according to another embodiment of the present disclosure. The information processing method is described in detail below.

S401, acquiring a contact list.

For example, the contact list may include the contact list of various communication applications, such as the address book, WeChat contact list, QQ contact list, Skype contact list, etc. Further, the contact list may also include a mailbox list, etc.

S402, identifying and setting a privacy label for one or more contacts from the contact list, the privacy label may be used call an identity authentication unit to determine whether the responder can answer the connection request for the call connection in response to the communication identifier of the requester matching the communication identifier of the contact with the privacy label. In other words, a privacy label are set for one or more contacts from the contact list. The privacy label indicates that a determination is required about whether a responder is permitted to response to the connection request, when receiving a connection request from a contact with the privacy label.

The privacy label may be set by using various labelling methods in conventional technology, and will not be described in detail here.

In addition, the method may further include an operation S403, which includes generating a privacy form based on the privacy label, the privacy form may be used to determine whether the communication identifier of the requester meets a privacy condition. As such, the privacy of both parties of the call may be protected based on the privacy form.

Figure 5:
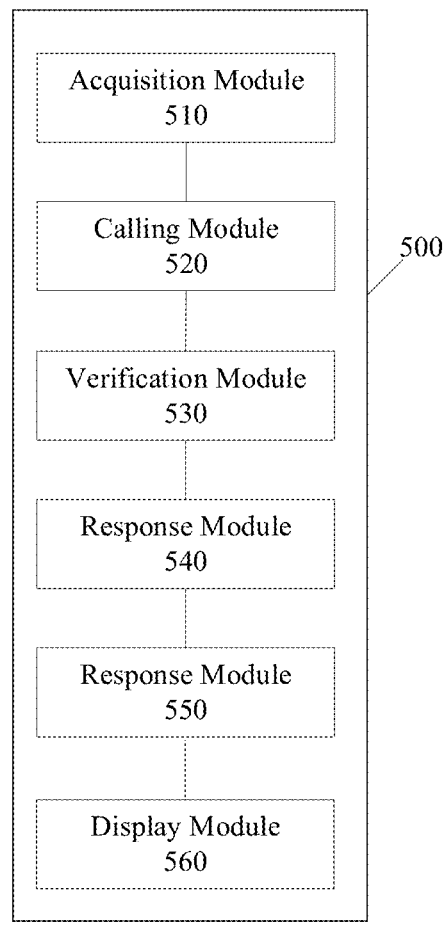
FIG. 5 is a block diagram of an information processing apparatus according to an embodiment of the present disclosure.

FIG. 5 is a block diagram of the information processing apparatus according to an embodiment of the present disclosure.

As shown in FIG. 5, an information processing apparatus 500 includes a request acquisition module 510, a calling module 520, a verification module 530, and a response module 540. The information processing apparatus 500 may execute the method described above to protect the privacy of both parties in a call.

More specifically, the request acquisition module 510 may be configured to acquire a connection request for establishing a call connection, where the connection request may include at least the communication identifier of the requester.

The calling module 520 may be configured to call an identity authentication unit in response to the communication identifier of the requester meeting a privacy condition.

The verification module 530 may be configured to verify the identity of the responder based on the identity authentication unit.

The response module 540 may be configured to determine, based on a verification result of the identity authentication unit, whether the responder can answer the connection request for the call connection.

In some embodiments, the response module 540 may include a first unit and a second unit. The first unit may be configured to allow the connection request for the call connection to be responded in response to the verification result indicating the identify verification of the responder passes. The second unit may be configured to prohibit a response to the connection request for the call connection in response to the verification result indicating the identify verification of the responder fails.

In addition, the information processing apparatus 500 may further include a response module 550. The response module 550 may be configured to permit the response of the responder to the connection request upon determining that the user identity of the requester does not meet the privacy condition.

In addition, the information processing apparatus 500 may further include a display module 560.

The display module 560 may be configured to display an interactive interface when receiving a connection request for establishing a call connection. The interactive interface may include at least a communication identifier of the requester and an answering control, and the answering control may include a first state and a second state. The first state may indicate that the connection request for the call connection can be responded, and the second state may indicate that the connection request for the call connection is prohibited from responding.

In some embodiments, if the answering control is in the first state, an input operation for the answering control in the first state may be acquired, and the communication connection with the communication identifier of the requester may be established in response to the input operation. If the answering control is in the second state, an input operation for the answering control in the second state may be acquired, and the input operation may be ignored.

In addition, the communication identifier of the requester meeting the privacy condition may further include the communication request further including an authentication template sent by the requester. Correspondingly, the verification module 530 may be configured to verify the identity of the responder based on the information acquired by the identity authentication unit and the authentication template.

Figure 6:
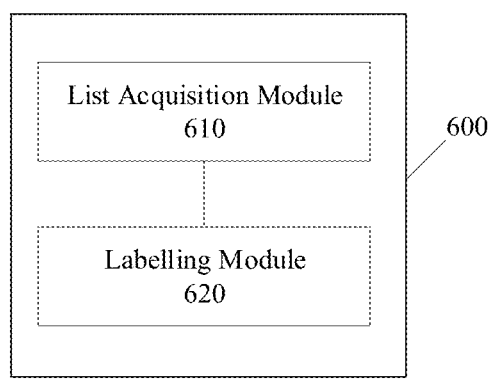
FIG. 6 is a block diagram of the information processing apparatus according to another embodiment of the present disclosure.

FIG. 6 is a block diagram of the information processing apparatus according to another embodiment of the present disclosure.

As shown in FIG. 6, an information processing apparatus 600 includes a list acquisition module 610 and a labelling module 620.

In some embodiments, the list acquisition module 610 may be configured to acquire a contact list.

The labelling module 620 may be configured to determine and set a privacy label of one or more contacts from the contact list. The privacy label may be used to call the identity authentication unit to determine whether the responder can answer the connection request for the call connection if the communication identifier of the requester matches the communication identifier of the contact with the privacy label.

For details of the calling process of the identity authentication unit, the identity authentication process, and the process of responding to the connection request, reference may be made to the above description of the embodiments of the present disclosure, and will not be repeated herein again.

In the embodiment of the present disclosure, the owner of the electronic device may set a security label for the phone number that needs to pass the identity authentication to be able to respond to the call through the address book. If the phone number with the security label is set for an incoming call, the identity authentication module may need to be called to determine whether the answering of the incoming call can be responded based on the verification result of the identity authentication module. In some embodiments, the incoming call may be a voice call or a video call. The embodiments of the present disclosure can effectively protect the privacy of the answering user (the owner) and the calling user (the other party). For example, parents may set the video call of the children to require the parents to verify the identity to answer, not as anyone can answer in the conventional technology. As such, the security of the children's privacy can be effectively protected such that the children's images may be not acquired by anyone other than the parents, and or course, the parents' protection of the children can be ensured.

Any of a plurality of modules, sub-modules, units, sub-units, or at least some of the functions of any one of the plurality of modules, sub-modules, or any of the plurality of functions according to certain embodiments of the present disclosure may be implemented in one module. Any one or more of the modules, sub-modules, units, sub-units according to certain embodiments of the present disclosure may be implemented by being split into a plurality of modules. Any one or more of the modules, sub-modules, units, sub-units according to embodiments of the present disclosure may be at least partially implemented as hardware circuits, such as a Field Programmable Gate Array (FPGA), a Programmable Logic Array (PLA), System-on-a-chip, system on a substrate, system on a package, an application-specific integrated circuit (ASIC), or any other reasonable means of hardware or firmware that integrates or encapsulates the circuit, or in software, hardware, and firmware. Any one of the implementations or in any suitable combination of any of them. Alternatively, one or more of the modules, sub-modules, units, sub-units according to embodiments of the present disclosure may be implemented at least in part as a computer programs stored in computer readable medium. When executed by one or more processors, the computer program can perform the corresponding functions of the module.

For example, any of the request acquisition module 510, calling module 520, verification module 530, response module 540, response module 550, and display module 560 may be combined and implemented in one module, or any one of the modules may be split into multiple modules. Alternatively, at least some of the functionality of one or more of the modules may be combined with at least some of the functionality of the other modules and implemented in one module. According to certain embodiments of the present disclosure, at least one of the request acquisition module 510, calling module 520, verification module 530, response module 540, response module 550, and display module 560 may be at least partially implemented as a hardware circuit, such as a field programmable gate array (FPGA), a programmable logic array (PLA), a system on a chip, a substrate. The system, the system on the package, the application specific integrated circuit (ASIC), or any other reasonable way to integrate or package the circuit, or hardware, firmware, or software, hardware, and firmware. Either or in any suitable combination of any of these. Alternatively, at least one of the request acquisition module 510, calling module 520, verification module 530, response module 540, response module 550, and display module 560 can be implemented at least in part as a computer program module that can perform the corresponding functions when the computer program module is executed by one or more processors.

Figure 7:
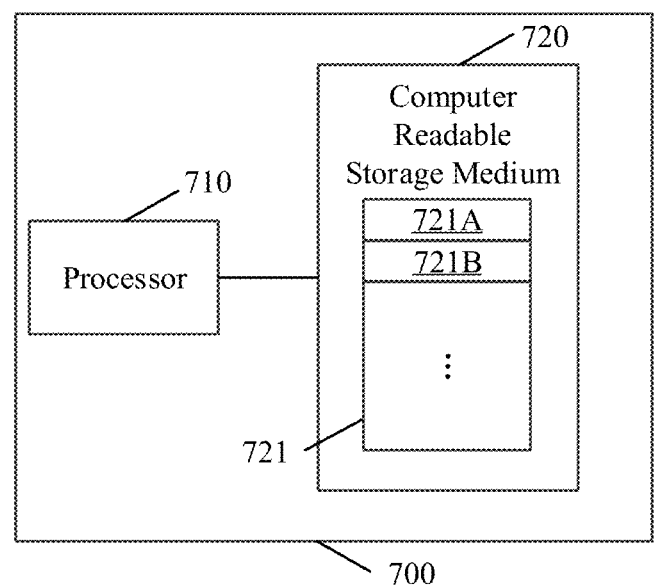
FIG. 7 is a block diagram of an electronic device according to an embodiment of the present disclosure.

FIG. 7 is a block diagram of an electronic device according to another embodiment of the present disclosure. The electronic device shown in FIG. 7 is merely an example, and should not impose any limitation on the functions and use range of the embodiments of the present disclosure.

As shown in FIG. 7, an electronic device 700 includes one or more processors 710 and a computer readable storage medium 720. In some embodiments, a server cluster may execute the method according to the embodiments of the present disclosure.

More specifically, the processors 710 may include a general-purpose microprocessor, an instruction set processor, and/or a related chipset and/or a special purpose microprocessor (e.g., an application specific integrated circuit (ASIC)), and the like. Processor 710 may also include an onboard memory for caching purposes. Processor 710 may be a single processing unit or a plurality of processing units for performing different acts of a method flow according to certain embodiments of the present disclosure.

The computer readable storage medium 720, for example, can be a non-volatile computer readable storage medium. An example may include, but is not limited to a magnetic tape or hard disk (HDD); an optical storage device, such as a compact disk (CD-ROM); a memory such as a random access memory (RAM) or a flash memory, etc.

The computer readable storage medium 720 may include a program 721, the program 721 may include code/computer-executable instructions, which, when executed by the 710, may cause the processor 710 to execute the method or any other variation thereof according to the embodiments of the present disclosure.

The program 721 can be configured to have computer program code, for example, including a computer program that can be stored in computer readable medium. For example, in an example embodiment, the code in computer program 721 may include one or more program modules, including, for example, a module 721A, a module 721B . . . . It should be noted that the division manner and the number of modules is not fixed, and those skilled in the art may use suitable program modules or program module combinations according to actual situations. When these program module combinations are executed by the processor 710, the processor 710 may execute the method or any other variation thereof according to the embodiments of the present disclosure.

According to the embodiments of the present disclosure, the processor 710 may interact with the computer readable storage medium to execute the method or any other variation thereof according to the embodiments of the present disclosure.

According to the embodiments of the present disclosure, at least one of the request acquisition module 510, calling module 520, verification module 530, response module 540, response module 550, and display module 560 may be implemented as a program module described with reference to FIG. 7, which, when executed by the processor 710, may implement the corresponding operations described above.

The present disclosure further provides a computer readable storage medium, which may be included in the apparatus/device/system described in the above embodiments; or may be separately present without being incorporated into the apparatus/device/system. The computer readable storage medium may store one or more programs that implement the information processing method in the foregoing description when the one or more programs are executed.

According to an embodiment of the present disclosure, the computer readable storage medium may be a non-volatile computer readable storage medium, which may include, but is not limited to a portable computer disks, hard disks, random access memory (RAM), read only memory (ROM), erasable programmable read only memory (EPROM or flash memory), portable compact disk read only memory (CD-ROM), optical storage device, magnetic storage device, or any suitable combination of the foregoing. In the present disclosure, a computer readable storage medium may be any tangible medium that can contain or store a program, which can be used by or in connection with an instruction execution system, apparatus, or device.

The flowchart and block diagrams in the drawings illustrate the architecture, functionality, and operation of possible implementations of systems, methods, and computer program products according to various embodiments of the present disclosure. Each block of the flowchart or block diagrams may represent a module, a program segment, or a portion of code that includes one or more executable instructions. It should also be noted that, in some alternative implementations, the functions noted in the blocks may occur in different order. For example, two successively represented blocks may in fact be executed substantially in parallel, and they may sometimes be executed in the reverse order, depending upon the functionality involved. It is also noted that each block of the block diagrams or flowcharts, and combinations of blocks in the block diagrams or flowcharts, can be implemented by a dedicated hardware-based system that performs the specified function or operation, or can be implemented by a combination of dedicated hardware and computer instructions.

It will be appreciated by those skilled in the art that the variations and/or combinations of the various embodiments of the present disclosure and/or the claims may be made, even if such variations or combinations are not explicitly described in the present disclosure. In particular, various combinations of the features described in the various embodiments and/or claims of the present disclosure can be made without departing from the spirit and scope of the disclosure. All such combinations fall within the scope of the disclosure.

Although the present disclosure has been shown and described with respect to the specific exemplary embodiments, it will be understood by those skilled in the art that various changes in form and detail can be made to the present disclosure. Therefore, the scope of the present disclosure should not be limited to the forgoing described embodiments, but should be determined not only by the appended claims but also by the equivalents of the appended claims.

What is claimed is:

1. An information processing method, comprising:
   receiving, at a current electronic device, a connection request of establishing a call connection, the connection request including a communication identifier of a requester;
   searching the communication identifier of the requester in a privacy form and determining that the communication identifier of the requester meets a privacy condition upon determining the communication identifier of the request belonging to the privacy form;
   upon determining the requester meeting the privacy condition, acquiring at least one kind of biometric information of the requester, and performing identity authentication based on the biometric information;
   upon determining the communication identifier of the requester meeting the identity authentication, verifying an identity of a responder; and
   determining whether to permit a response of the responder to the connection request based on a verification result of the identity of the responder.

2. The method of claim 1, wherein determining whether to permit the response of the responder to the connection request based on the verification result of the identity of the responder includes:
   if the verification result of the identity verification of the responder passes, permitting the response of the responder to the connection request; and
   if the verification result of the identity verification of the responder fails, prohibiting the call connection with the requester.

3. The method of claim 2, further including:
   displaying an interactive interface when receiving the connection request of establishing the call connection, wherein the interactive interface includes the communication identifier of the requester and an answering control, the answering control includes a first state indicating the response to the connection request is permitted and a second state indicating the call connection is prohibited;
   if the answering control is in the first state, acquiring an input operation on the answering control in the first state and responding to the connection request based on the input operation; and
   if the answering control is in the second state, ignoring the input operation on the answering control.

4. The method of claim 2, further comprising: after receiving the connection request of establishing the call connection,
   upon determining the communication identifier of the requester meeting the privacy condition, verifying the identity of the responder if the current electronic device is in a locked state; and
   permitting the response to the connection request from any requester if the current electronic device being in an unlocked state.

5. The method of claim 1, further comprising:
   permitting the response of the responder to the connection request upon determining the user identity of the requester not meeting the privacy condition.

6. The method of claim 4, further comprising:
   identifying and setting a privacy label for one or more contacts from a contact list; and
   generating the privacy form that includes one or more identifiers of the one or more contacts with the privacy label.

7. The method of claim 1, wherein:
   the connection request further includes an authentication template from the requester; and
   verifying the identity of the responder comprises: verifying the identity of the responder based on information acquired by an identity authentication unit and the authentication template.

8. The information processing method of claim 1, wherein the connection request further including a photo or an avatar related to the photo of a responder requested to answer the call by the requester; and verifying the identity of the responder further including concurrently comparing a face image of the responder captured by a camera of the current electronic device with the photo.

9. An electronic device, comprising: a memory; and a processor coupled to the memory and configured to perform:
- receiving a connection request of establishing a call connection, the connection request includes a communication identifier of a requester;
- searching the communication identifier of the requester in a privacy form and determining that the communication identifier of the requester meets a privacy condition upon determining the communication identifier of the request belonging to the privacy form;
- upon determining the requester meeting the privacy condition, acquiring at least one kind of biometric information of the requester and performing identity authentication based on the biometric information;
- upon determining the communication identifier of the requester meeting identity authentication, verifying an identity of a responder; and
- determining whether to permit a response to the connection request based on a verification result of the identity of the responder.

10. The device of claim 9, wherein determining whether to permit the response of the responder to the connection request based on the verification result of the identity of the responder includes:
- if the verification result of the identity verification of the responder passes, permitting the response of the responder to the connection request; and
- if the verification result of the identity verification of the responder fails, prohibiting the call connection with the requester.

11. The device of claim 10, wherein the processor is further configured to perform:
- displaying an interactive interface when receiving the connection request of establishing the call connection, wherein the interactive interface includes the communication identifier of the requester and an answering control, the answering control includes a first state indicating the response to the connection request is permitted and a second state indicating the call connection is prohibited;
- if the answering control is in the first state, acquiring an input operation on the answering control in the first state and responding to the connection request based on the input operation; and
- if the answering control is in the second state, ignoring the input operation on the answering control.

12. The device of claim 10, wherein the processor is further configured to perform: after receiving the connection request of establishing the call connection,
- upon determining the communication identifier of the requester meeting the privacy condition, verifying the identity of the responder if the electronic device is in a locked state; and
- permitting the response to the connection request from any requester if the current electronic device is in an unlocked state.

13. The device of claim 9, wherein the processor is further configured to perform:
- permitting the response of the responder to the connection request upon determining the user identity of the requester not meeting the privacy condition.

14. The device of claim 9, wherein the processor is further configured to perform:
- identifying and setting a privacy label for one or more contacts from a contact list; and
- generating the privacy form that includes one or more identifiers of the one or more contacts with the privacy label.

15. The device of claim 9, wherein:
- the connection request further includes an authentication template from the requester; and
- verifying the identity of the responder comprises: verifying the identity of the responder based on information acquired by an identity authentication unit and the authentication template.

16. The device of claim 9 further comprises a camera and the communication identifier of the requester further includes a photo, or an avatar related to the photo of a responder requested to answer the call by the requester; and wherein verifying the identity of the responder further including concurrently comparing a face image of the responder captured by a camera of the electronic device with the photo.

* * * * *